United States Patent
Burnard

(10) Patent No.: US 7,029,398 B1
(45) Date of Patent: Apr. 18, 2006

(54) FLANGE YOKE AND COMPANION FLANGE SUPPORTED ON A SPLINED SHAFT

(75) Inventor: Jonathan Burnard, Brantford (CA)

(73) Assignee: Torque-Traction Technologies, Inc,, Maumee, OH (US)

( * ) Notice: Subject to any disclaimer, the term of this patent is extended or adjusted under 35 U.S.C. 154(b) by 0 days.

(21) Appl. No.: 10/335,576

(22) Filed: Dec. 31, 2002

(51) Int. Cl.
F16D 3/40 (2006.01)
(52) U.S. Cl. ........................... 464/134; 403/14
(58) Field of Classification Search ............ 464/23, 464/134, 135, 182; 403/13, 14, 359.1, 359.4, 403/337; 180/383
See application file for complete search history.

(56) References Cited

U.S. PATENT DOCUMENTS

| | | | |
|---|---|---|---|
| 1,355,516 A * | 10/1920 | Stahl | 180/383 X |
| 2,516,472 A * | 7/1950 | Mackeage, Jr. | 403/337 X |
| 2,876,878 A * | 3/1959 | Sinclair et al. | |
| 3,827,121 A | 8/1974 | Frederick | |
| 4,253,776 A * | 3/1981 | Orain | 403/337 |
| 4,307,833 A | 12/1981 | Barnard | |
| 4,395,246 A | 7/1983 | Taig et al. | |
| 4,540,383 A | 9/1985 | Taig | |
| 4,945,745 A * | 8/1990 | Bathory et al. | |
| 5,469,931 A * | 11/1995 | Kawata et al. | 180/383 X |
| 5,472,073 A * | 12/1995 | Hay | 180/383 X |
| 5,823,703 A * | 10/1998 | Thomas et al. | 464/182 X |
| 6,234,907 B1 * | 5/2001 | Moser | 464/134 |

FOREIGN PATENT DOCUMENTS

| | | | | |
|---|---|---|---|---|
| DE | 621498 | * | 10/1935 | 403/337 |
| GB | 457418 | * | 11/1936 | 464/135 |
| GB | 626-779 | * | 7/1949 | 464/182 |

OTHER PUBLICATIONS

Universal Joint and Driveshaft Design Manual, AE-7, Society of Automotive Engineers, Inc., Warendale, PA, pp. 70 & 71, TJ1079.S62 1979.*

* cited by examiner

Primary Examiner—Greg Binda
(74) Attorney, Agent, or Firm—MacMillan, Sobanski & Todd, LLC

(57) ABSTRACT

A flange yoke is precisely positioned on a companion flange that, in turn, is supported on a male splined shaft having a pilot that protrudes co-axially therefrom. The companion flange includes a female splined sleeve portion that cooperates with the male splined shaft and a flange portion that has a plurality of apertures formed therethrough. The flange yoke includes a flange portion that has a plurality of apertures formed therethrough that correspond generally in size and location with the plurality of apertures formed through the flange portion of the companion flange and a and a yoke portion. When the flange portion of the flange yoke is disposed adjacent to the flange portion of the companion flange, the apertures formed through the flange portion of the companion flange are axially aligned with the apertures formed through the flange portion of the flange yoke. The flange yoke has a pilot receiver that receives the pilot that protrudes from the splined shaft. As result, the flange yoke is precisely positioned relative to the axis of rotation of the splined shaft, regardless of any dimensional variations in the manufacture of each of the various components.

15 Claims, 3 Drawing Sheets

FLANGE YOKE AND COMPANION FLANGE SUPPORTED ON A SPLINED SHAFT

BACKGROUND OF THE INVENTION

This invention relates in general to drive train systems for transferring rotational power from an engine/transmission assembly to an axle assembly in a vehicle drive train system. In particular, this invention relates to an improved structure for precisely positioning a flange yoke on a companion flange that, in turn, is supported on a splined shaft in such a drive train system.

Drive train systems are widely used for generating power from a source and for transferring such power from the source to a driven mechanism. Frequently, the source generates rotational power, and such rotational power is transferred from the is source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

The output shaft of the engine/transmission assembly is typically embodied as a male splined member that is generally cylindrical in shape and has a plurality of outwardly extending splines formed on the outer surface thereof. To connect the output shaft of the engine/transmission assembly to the front universal joint, a companion flange and flange yoke assembly is often provided. The companion flange and flange yoke assembly includes two physically separate components, namely, a companion flange and a flange yoke, that are secured together for concurrent rotational movement. The companion flange usually includes a hollow cylindrical sleeve portion and a disc-shaped flange portion. The sleeve portion of the companion flange has a plurality of inwardly extending splines formed on an inner surface thereof that cooperate with the outwardly extending splines of the male member so as to connect the sleeve portion to the output shaft of the engine/transmission assembly for rotational movement. The flange portion of the companion flange is formed integrally with the sleeve portion and has a plurality of apertures formed therethrough. The flange yoke usually includes a disc-shaped flange portion and a yoke portion. The flange portion of the flange yoke has a corresponding plurality of apertures formed therethrough that receive respective threaded fasteners to secure the flange yoke to the companion flange. The yoke portion of the flange yoke is formed integrally with the flange portion and has a pair of spaced apart yoke arms formed thereon that cooperate with a cross and the front end fitting of the driveshaft assembly to form the front universal joint.

As with all mechanical structures that physically engage one another, the precise positioning of the output shaft of the engine/transmission assembly, the companion flange, and the flange yoke relative to one another is limited by dimensional variations in the manufacture of each of these individual components. Thus, in the above-described structure, a first predetermined tolerance for such dimensional variations exists between the male splined output shaft of the engine/transmission assembly and the female splined companion flange that is mounted thereon. Additionally, a second predetermined tolerance for such dimensional variations exists between the companion flange and the flange yoke that is secured thereto. It has been found that in some instances, these first and second predetermined tolerances can, in the aggregate, introduce an undesirable amount of imprecision in the positioning of the output shaft of the engine/transmission assembly, the companion flange, and the flange yoke relative to one another. Such imprecise positioning can result in undesirable imbalances when the driveshaft assembly is rotated during use. Thus, it would be desirable to provide an improved structure for precisely positioning an output shaft of a engine/transmission assembly, a companion flange, and a flange yoke relative to one another to minimize such imbalances.

SUMMARY OF THE INVENTION

This invention relates to an improved structure for precisely positioning a flange yoke on a companion flange that, in turn, is supported on a splined shaft in a vehicular drive train system. The splined shaft, which may be an output shaft of a engine-driven transmission in a vehicle drive train system, is a male splined member that is generally cylindrical in shape and has a plurality of outwardly extending splines formed on the outer surface thereof. A pilot protrudes from the splined shaft, preferably extending precisely co-axially relative to the axis of rotation thereof. The companion flange includes a hollow cylindrical sleeve portion and a disc-shaped flange portion. The sleeve portion of the companion flange has a plurality of inwardly extending splines formed on an inner surface thereof that cooperate with the outwardly extending splines of the splined shaft so as to connect the sleeve portion for rotational movement therewith. The flange portion of the companion flange has a plurality of apertures formed therethrough. The flange yoke includes a disc-shaped flange portion and a yoke portion. The flange portion of the flange yoke has a plurality of apertures formed therethrough that correspond generally in size and location with the plurality of apertures formed through the flange portion of the companion flange. Thus, when the flange portion of the flange yoke is disposed adjacent to the flange portion of the companion flange, the apertures formed through the flange portion of the companion flange are axially aligned with the apertures formed through the flange portion of the flange yoke. The flange yoke has a pilot receiver formed or otherwise provided therein that receives the pilot that protrudes from the splined shaft. As result, the flange yoke is precisely positioned relative to the axis of rotation of the splined shaft, regardless of any dimensional variations in the manufacture of each of the various components.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
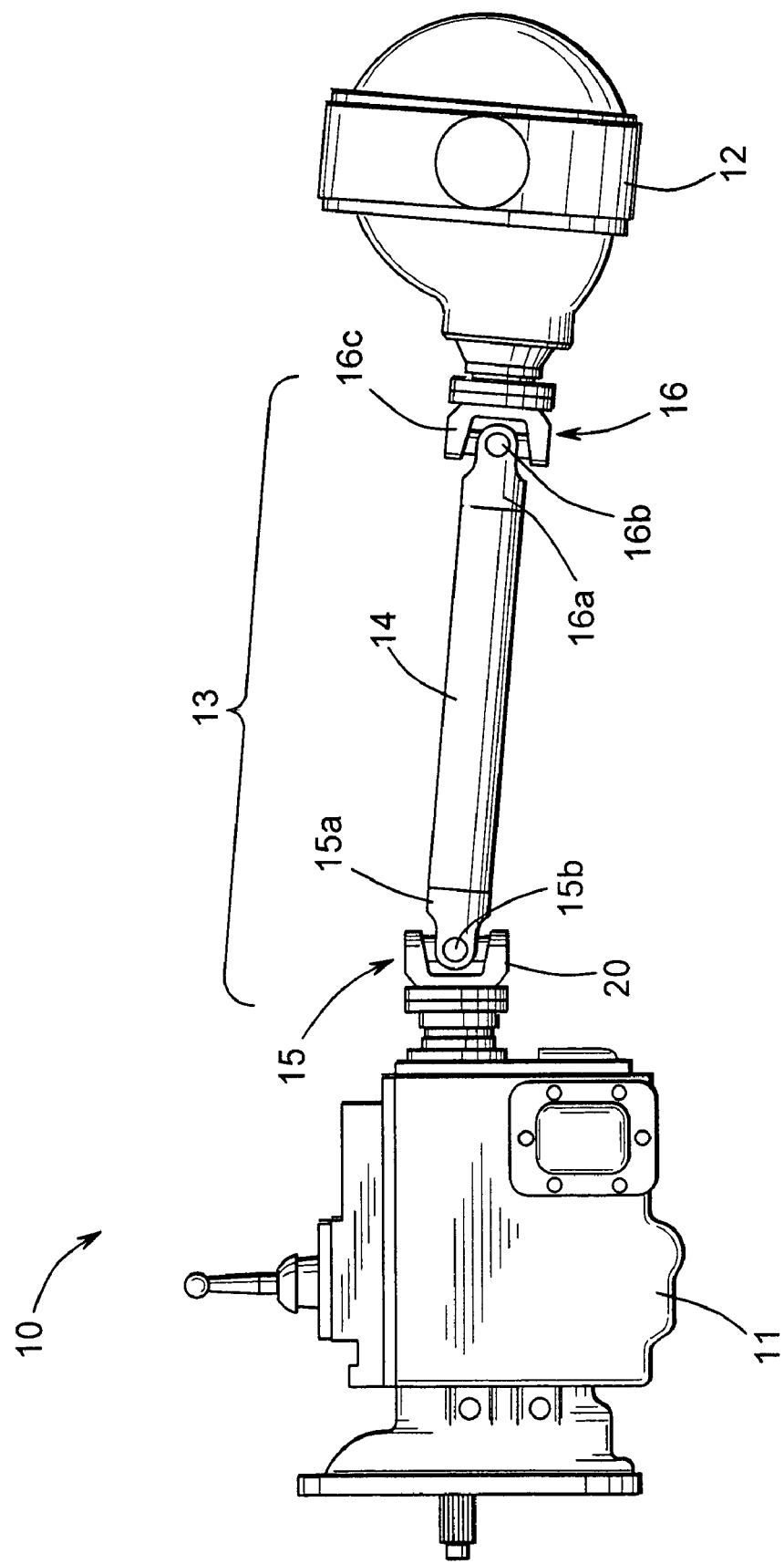
FIG. 1 is a side elevational view of a vehicular drive train system including an output shaft of a transmission, a companion flange, and a flange yoke in accordance with this invention.

Referring now to the drawings, there is illustrated in FIG. 1 a drive train system, indicated generally at 10, for a vehicle that is adapted to transmit rotational power from a source of rotation power (not shown) to a plurality of driven wheels (not shown). The illustrated drive train system 10 is, for the most part, conventional in the art and is intended merely to illustrate one environment in which this invention may be used. Thus, the scope of this invention is not intended to be limited for use with the specific structure for the vehicle drive train system 10 illustrated in FIG. 1 or to vehicle drive train systems in general. On the contrary, as will become apparent below, this invention may be used in any desired environment for the purposes described below.

The illustrated drive train system 10 includes a transmission 11 having an output shaft 11a (see FIGS. 2 and 3) that is connected to an input shaft (not shown) of an axle assembly 12 through a driveshaft assembly 13. The transmission 11 is rotatably driven by an engine (not shown) that generates rotational power in a conventional manner. The driveshaft assembly 13 includes a cylindrical driveshaft tube 14 having a center portion and a pair of opposed end portions. The output shaft 11a of the transmission 11 and the input shaft of the axle assembly 12 are typically not to co-axially aligned. To accommodate this, a pair of universal joints, indicated generally at 15 and 16, are provided to respectively connect the end portions of the driveshaft tube 14 to the output shaft 11a of the transmission 11 and to the input shaft of the axle assembly 12. The first universal joint 15 includes a tube yoke 15a that is secured to the forward end portion of the driveshaft tube 14 by any conventional means, such as by welding. The first universal joint 15 further includes a cross 15b that is connected to the tube yoke 15a in a conventional manner. Lastly, the first universal joint 15 includes a companion flange and flange yoke assembly, indicated generally at 20, that is connected to the output shaft 11a of the transmission 11 and to the cross 15b. The structure of the companion flange and flange yoke assembly 20 will be described in detail below. Similarly, the second universal joint 16 includes a tube yoke 16a that is secured to the rearward end portion of the driveshaft tube 14 by any conventional means, such as by welding. The second universal joint 16 further includes a cross 16b that is connected to the tube yoke 16a in a conventional manner. Lastly, the second universal joint 16 includes an end yoke 16c that is connected to the cross 16b and to the input shaft of the axle assembly 12. The first and second universal joints 15 and 16 provide a rotational driving connection from the output shaft 11a of the transmission 11 through the driveshaft tube 14 to the input shaft of the axle assembly 12, while accommodating a limited amount of angular misalignment between the rotational axes of these three shafts.

Figure 2:
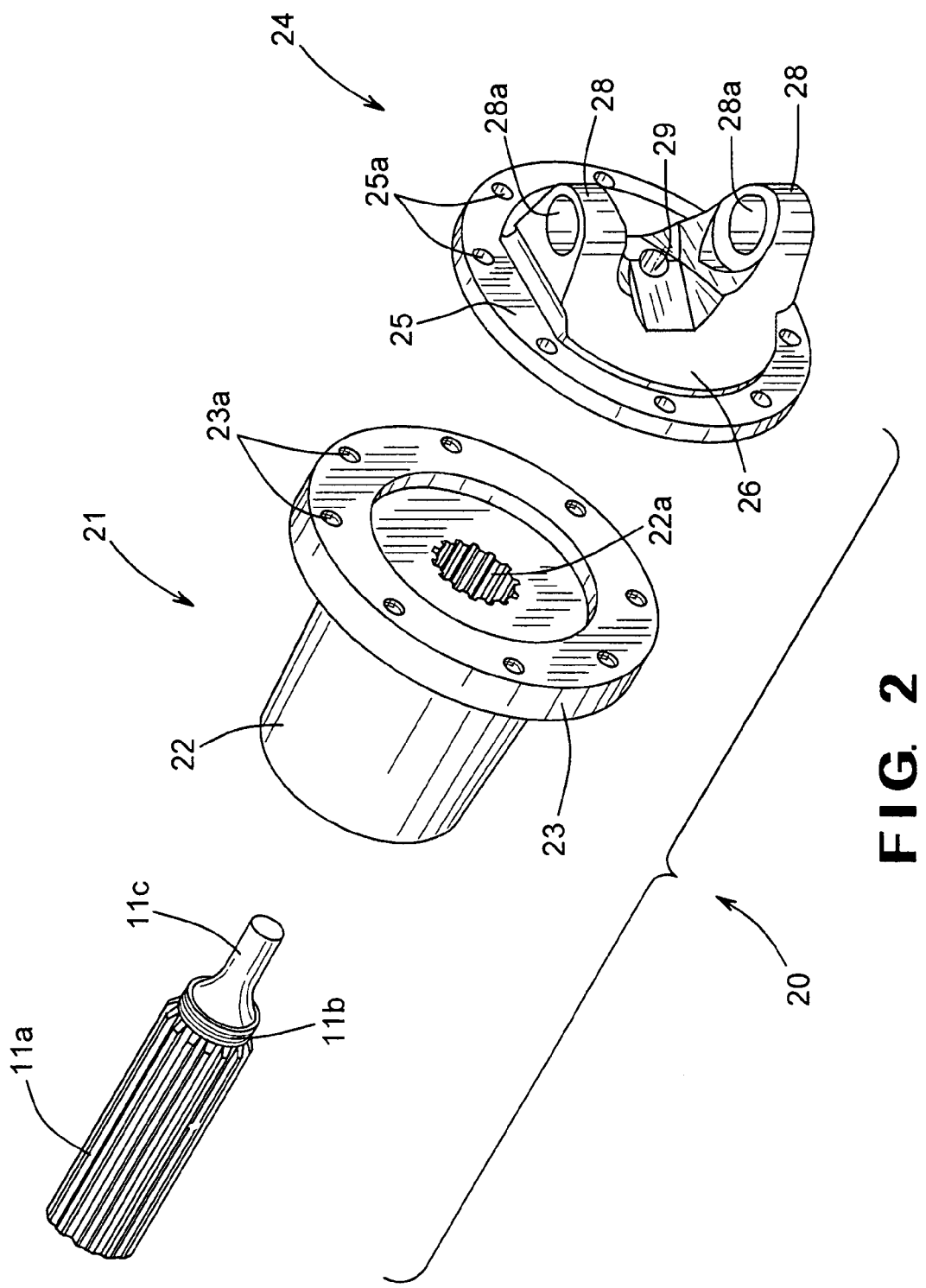
FIG. 2 is an enlarged exploded perspective view of the output shaft of the transmission, the companion flange, and the flange yoke illustrated in FIG. 1.
Figure 3:
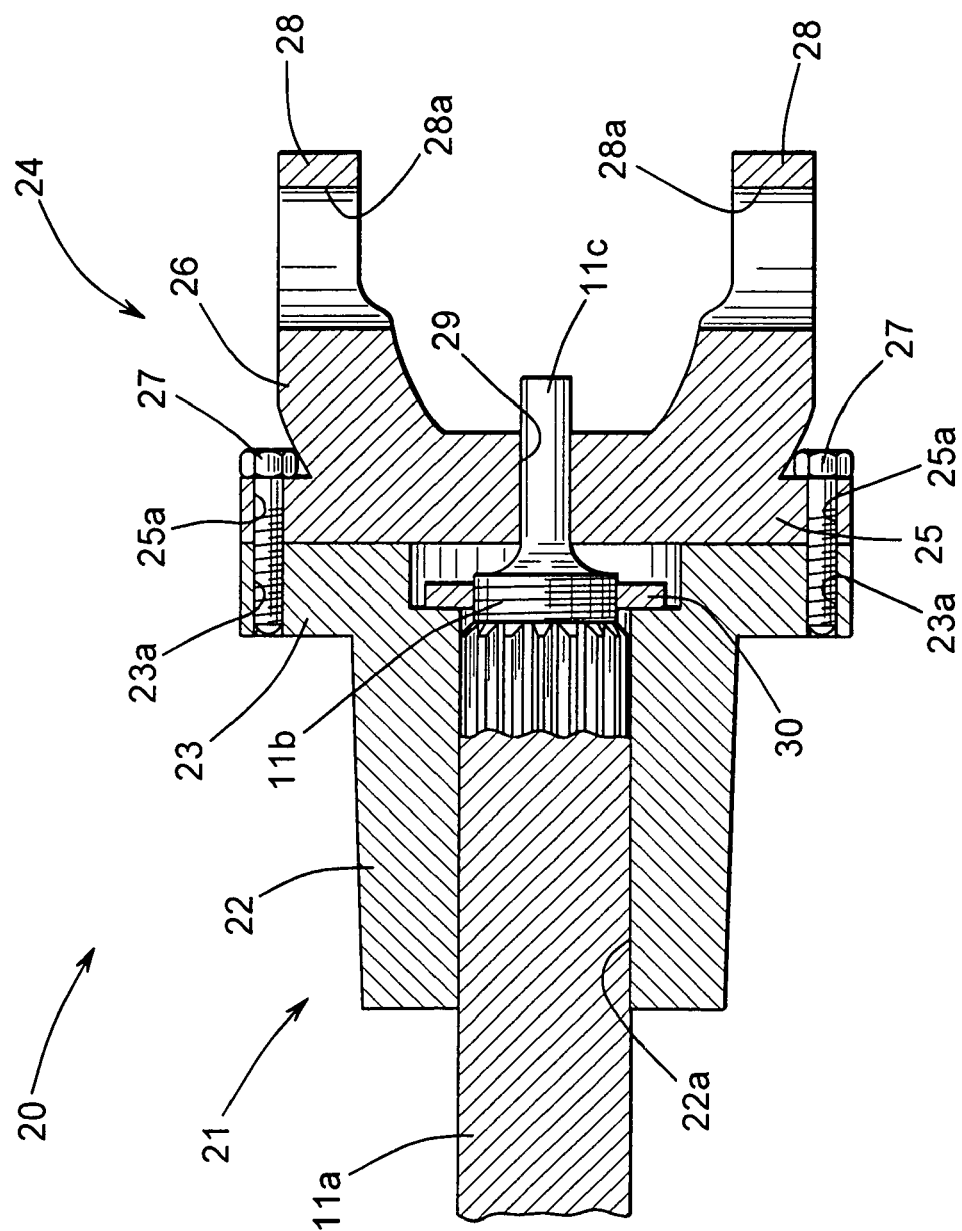
FIG. 3 is an enlarged sectional elevational view of the output shaft of the transmission, the companion flange, and the flange yoke illustrated in FIG. 2 shown assembled.

The structure of the output shaft 11a of the transmission 11 is illustrated in detail in FIGS. 2 and 3. As shown therein, the output shaft 11a of the transmission 11 is a male splined member that is generally cylindrical in shape and has a plurality of outwardly extending splines formed on the outer surface thereof. A threaded end portion 11b may, if desired, be formed on the end of the output shaft 11a for a purpose that will be explained below. A pilot 11c protrudes from the threaded end portion 11b of the output shaft 11a. In the illustrated embodiment, the pilot 11c is formed integrally with the output shaft 11a and is reduced in dimension relative to the output shaft 11a, although such is not required. The pilot 11c preferably extends precisely co-axially relative to the axis of rotation of the output shaft 11a. The pilot 11c is preferably formed having an outer surface that, in the illustrated embodiment, is generally cylindrical in shape, although such is not required. At least a portion of the outer surface of the pilot 11c is preferably formed at a precise distance or location relative to the axis of rotation of the output shaft 11a. The purpose for the pilot 11c and the precise positioning of the outer surface thereof relative to the axis of rotation of the output shaft 11a will be explained below.

The structure of the companion flange and flange yoke assembly 20 is also illustrated in detail in FIGS. 2 and 3. As shown therein, the companion flange and flange yoke assembly 20 includes a companion flange, indicated generally at 21, that is adapted to be supported on the output shaft 11a of the transmission 11 for concurrent rotational movement. The companion flange 21 includes a hollow cylindrical sleeve portion 22 and a disc-shaped flange portion 23. The sleeve portion 22 of the companion flange 21 has a plurality of inwardly extending splines 22a formed on an inner surface thereof that cooperate with the outwardly extending splines of the output shaft 11a of the transmission 11 so as to connect the sleeve portion 22 for rotational movement with such output shaft 11a. The flange portion 23 of the companion flange 21 is preferably formed integrally with the sleeve portion 22, although such is not required. The flange portion 23 of the companion flange 21 has a plurality of apertures 23a formed therethrough. The purpose for such apertures 23a will be explained below.

The companion flange and flange yoke assembly 20 also includes a flange yoke, indicated generally at 24, that is adapted to be supported on the companion flange 21 for rotation therewith. The flange yoke 24 includes a disc-shaped flange portion 25 and a yoke portion 26. The flange portion 25 of the flange yoke 24 has a plurality of apertures 25a formed therethrough that correspond generally in size and location with the plurality of apertures 23a formed through the flange portion 23 of the companion flange 21. Thus, when the flange portion 25 of the flange yoke 24 is disposed adjacent to the flange portion 23 of the companion flange 21 as shown in FIG. 3, the apertures 23a formed through the flange portion 23 of the companion flange 21 are axially aligned with the apertures 25a formed through the flange portion 25 of the flange yoke. A threaded fastener 27 (see FIG. 3) can then be inserted through each of the pairs of the aligned apertures 23a and 25a to secure the flange yoke 24 to the companion flange 21. The yoke portion 26 of the flange yoke 24 is preferably formed integrally with the flange portion 25, although such is not required. The yoke portion 26 has a pair of spaced apart yoke arms 28 formed thereon. Each of the yoke arms 28 has an opening 28a formed therethrough, and these openings 28a are axially aligned with one another. In a manner that is well known in the art, the openings 28a are adapted to receive respective bearing cups that are rotatably mounted on a first pair of opposed trunnions (not shown) of the front universal joint cross 15b described above. A second pair of opposed trunnions of the front universal joint cross 15b have respective bearing cups (not shown) that are received in corresponding openings formed in the tube yoke 15a of the driveshaft assembly 13 to form the front universal joint described above.

The flange yoke 24 has a pilot receiver 29 formed or otherwise provided therein. In the illustrated embodiment, the pilot receiver 29 is a hole that is formed completely through a central body portion of the flange yoke 24, although such is not required. The pilot receiver 29 preferably extends precisely co-axially relative to the axis of rotation of the flange yoke 24. The pilot receiver 29 is preferably formed having an inner surface that, in the illustrated embodiment, is generally cylindrical in shape, although such is not required. At least a portion of the inner surface of the pilot receiver 29 is preferably formed at a precise distance or location relative to the axis of rotation of the flange yoke 24. The purpose for the pilot receiver 29 and the precise positioning of the inner surface thereof will be explained below.

To assemble the companion flange and flange yoke assembly 20, the companion flange 21 is initially installed on the output shaft 11a of the transmission 11. To accomplish this, the hollow cylindrical sleeve portion 22 of the companion flange 21 is axially aligned with the output shaft 11a, then moved co-axially thereabout. As a result, the plurality of inwardly extending splines 22a formed on the inner surface of the sleeve portion 22 of the companion flange 21 cooperate with the outwardly extending splines of the output shaft 11a of the transmission 11 so as to connect the sleeve portion 22 for rotational movement with such output shaft 11a, as described above. If desired, a conventional nut 30 or other retaining mechanism may be threaded onto the threaded end portion 11b formed on the end of the output shaft 11a to positively retain the companion flange 21 on the output shaft 11a. Then, the flange yoke 24 is installed on the companion flange 21. To accomplish this, the flange portion 25 of the flange yoke 24 is disposed adjacent to the flange portion 23 of the companion flange 21, as shown in FIG. 3. At the same time, the pilot 11c that protrudes from the threaded end portion 11b of the output shaft 11a is received within the pilot receiver 29 formed on the flange yoke 24.

As discussed above, at least a portion of the outer surface of the pilot 11c is preferably formed at a precise distance or location relative to the axis of rotation of the output shaft 11a, and at least a portion of the inner surface of the pilot receiver 29 is preferably formed at a precise distance or location relative to the axis of rotation of the flange yoke 24. Thus, when the pilot 11c is received within the pilot receiver 29, the flange yoke 24 is precisely positioned relative to the axis of rotation of the output shaft 11a, regardless of any dimensional variations in the manufacture of each of the output shaft 11a of the transmission 11, the companion flange 21, and the flange yoke 24. Thereafter, the threaded fasteners 27 can be inserted through each of the pairs of axially aligned apertures 23a and 25a to secure the flange yoke 24 to the companion flange 21 to maintain this precise positioning during operation of the driveshaft assembly 13.

Although this invention has been described in the context of the illustrated male splined shaft 11a and the female splined sleeve portion 22 of the companion flange 21, it will be appreciated that this invention may be practiced with a female splined shaft 11a and a male splined sleeve portion 22 of the companion flange 21. Also, the shaft 11a and the sleeve portion 22 of the companion flange 21 may be connected together for rotation by any other mechanical structure or structures other than splines. Furthermore, although this invention has been described in the context of the illustrated pilot 11c protruding from the output shaft 11a into cooperation with the pilot receiver 29 provided on the flange yoke 24, it will be appreciated that this invention may be practiced by providing a pilot 11c protruding from the flange yoke 24 into cooperation with a pilot receiver 29 provided on the output shaft 11a.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An assembly comprising:
    a shaft including a portion that is reduced in exterior dimension relative to said shaft;
    a companion flange including a hollow sleeve portion and a disc-shaped flange portion having a first plurality of apertures formed therethrough, said hollow sleeve portion being connected to said shaft; and
    a flange yoke including a disc-shaped flange portion having a second plurality of apertures formed therethrough and a yoke portion, said disc-shaped flange portion being connected to said disc-shaped flange portion of said companion flange by a plurality of fasteners extending through said first and second pluralities of apertures, said yoke portion having a pair of spaced apart yoke arms extending from said disc-shaped flange portion and having aligned openings formed therethrough, said portion of said shaft and said flange yoke engaging one another to position said flange yoke relative to said shaft.

2. The assembly defined in claim 1 wherein said shaft has a first plurality of splines formed thereon and said hollow sleeve portion of said companion flange has a second plurality of splines formed thereon, said first and second pluralities of splines cooperating with one another to connect said companion flange to said shaft.

3. The assembly defined in claim 1 wherein said portion of said shaft is a pilot that is formed on said shaft, and wherein a pilot receiver is formed on said flange yoke, said pilot cooperating with said pilot receiver to position said flange yoke relative to said shaft.

4. The assembly defined in claim 3 wherein said pilot receiver is a hole formed in said flange yoke and said pilot extends from said shaft into said hole.

5. The assembly defined in claim 4 wherein said pilot receiver is hollow and cylindrical in shape and said pilot is cylindrical in shape.

6. The assembly defined in claim 3 wherein said pilot is formed integrally with said shaft.

7. The assembly defined in claim 3 wherein said pilot includes a surface that is located relative to an axis of rotation of said shaft, and wherein said pilot receiver includes a surface that is located precisely relative to an axis of rotation of said flange yoke, said surface of said pilot and said surface of said flange yoke cooperating with one another to position said axis of rotation of said shaft and said axis of rotation of said flange yoke relative to one another.

8. A drive train system comprising:
a transmission including an output shaft having a portion that is reduced in exterior dimension relative to said shaft;
a companion flange including a hollow sleeve portion and a disc-shaped flange portion having a first plurality of apertures formed therethrough, said hollow sleeve portion being connected to said shaft;
a flange yoke including a disc-shaped flange portion having a second plurality of apertures formed therethrough and a yoke portion, said disc-shaped flange portion being connected to said disc-shaped flange portion of said companion flange by a plurality of fasteners extending through said first and second pluralities of apertures, said yoke portion having a pair of spaced apart yoke arms extending from said disc-shaped flange portion and having aligned openings formed therethrough, said portion of said shaft and said flange yoke engaging one another to position said flange yoke relative to said shaft;
an axle assembly including an input shaft; and
a driveshaft assembly connecting said flange yoke to said input shaft of said axle assembly.

9. The drive train system defined in claim 8 wherein said shaft has a first plurality of splines formed thereon and said hollow sleeve portion of said companion flange has a second plurality of splines formed thereon, said first and second pluralities of splines cooperating with one another to connect said companion flange to said shaft.

10. The drive train system defined in claim 8 wherein said portion of said shaft is a pilot that is formed on said shaft, and wherein a pilot receiver is formed on said flange yoke, said pilot cooperating with said pilot receiver to position said flange yoke relative to said shaft.

11. The drive train system defined in claim 10 wherein said pilot receiver is a hole formed in said flange yoke and said pilot extends from said shaft into said hole.

12. The drive train system defined in claim 11 wherein said pilot receiver is hollow and cylindrical in shape and said pilot is cylindrical in shape.

13. The drive train system defined in claim 10 wherein said pilot is formed integrally with said shaft.

14. The drive train system defined in claim 10 wherein said pilot includes a surface that is located relative to an axis of rotation of said shaft, and wherein said pilot receiver includes a surface that is located precisely relative to an axis of rotation of said flange yoke, said surface of said pilot and said surface of said flange yoke cooperating with one another to position said axis of rotation of said shaft and said axis of rotation of said flange yoke relative to one another.

15. An assembly comprising:
a shaft having a first plurality of splines formed thereon and including a portion that is reduced in exterior dimension relative to said output shaft;
a companion flange including a hollow sleeve portion having a second plurality of splines formed thereon and a disc-shaped flange portion, said first and second pluralities of splines cooperating with one another to connect said hollow sleeve portion to said shaft; and
a flange yoke including a disc-shaped flange portion and a yoke portion, said disc-shaped flange portion being connected to said disc-shaped flange portion of said companion flange, said yoke portion having a pair of spaced apart yoke arms extending from said disc-shaped flange portion and having aligned openings formed therethrough, said portion of said shaft and said flange yoke engaging one another to position said flange yoke relative to said shaft.

* * * * *